Inventors
P.W. Sieber
P.C. Michael
By Glascock Downing & Seebold
Attys.

May 8, 1962 P. W. SIEBER ETAL 3,034,075

AMPLITUDE MODULATORS

Filed April 24, 1959 2 Sheets-Sheet 2

Inventors
P. W. Sieber
P. C. Michael
By Glascock Downing & Seebold
Attys.

United States Patent Office 3,034,075
Patented May 8, 1962

3,034,075

AMPLITUDE MODULATORS

Peter William Sieber and Peter Colin Michael, Beckenham, England, assignors to Muirhead & Co. Limited, Beckenham, England Filed Apr. 24, 1959, Ser. No. 808,764
Claims priority, application Great Britain June 18, 1958
3 Claims. (Cl. 332—47)

This invention relates to amplitude modulators more especially for use in communication circuits and particularly for use in facsimile transmitters and recorders for such purposes as (1) modulating a carrier with a photocell output, (2) re-modulating a new carrier frequency for improved operation of facsimile receivers and tape storage apparatus. Other applications are envisaged.

The invention consists of an amplitude modulator in which a direct current modulation signal is fed to the input of a bridge circuit, the impedance of one arm of which is switched at carrier frequency from a high impedance to a low impedance.

Conveniently, the switching is effected by shunt modulator circuit connected in said arm.

The main features of the modulator according to the invention are linearity over a wide range of input levels, a high degree of carrier frequency suppression and wide frequency range.

The invention will be further described with reference to the accompanying drawings.

Figure 1:
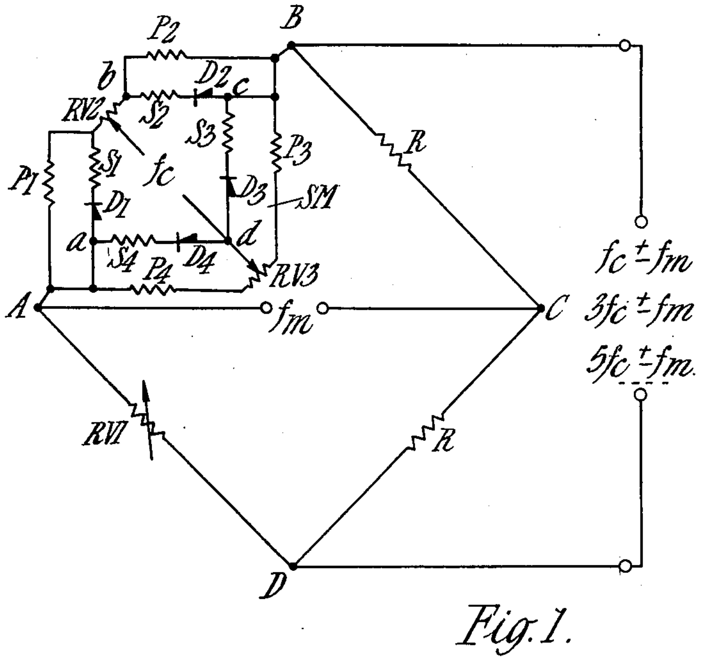
FIGURE 1 is a circuit diagram of a modulator according to the invention.

The circuit FIGURE 1 comprises a 4-arm bridge network A, B, C, D, in which the two arms B—C and C—D contain fixed non-reactive resistors R of equal ohmic value. The arm A—D contains a variable resistor RV1 and the arm A—B contains a shunt modulator circuit SM. The shunt modulator circuit comprises a further 4-arm bridge network *a*, *b*, *c*, *d*, the arms containing non-linear resistors $D_1$, $D_2$, $D_3$ and $D_4$ which, preferably, may be germanium or silicon diodes in series with which are non-reactive resistors $S_1$, $S_2$, $S_3$ and $S_4$. In parallel with the arms of the shunt modulating bridge are non-reactive resistors $P_1$, $P_2$, $P_3$ and $P_4$, the resistors $P_3$ and $P_4$ being connected through a resistance $RV_3$, a variable centre tap on which is connected to point *d*. The carrier frequency $f_c$ is injected across the diagonal *b*—*d* of the shunt modulator bridge, the connection at *b* being to a variable centre tap of a resistance $RV_2$, and the modulating frequency $f_m$ is injected across the diagonal A—C of the main bridge, while the products of modulation appear at the diagonal points B—D of the main bridge.

Referring particularly to the shunt modulator, it will be seen that the diodes are arranged all to be conducting on alternate half-cycles of the carrier frequency and thus the impedance of the main bridge arm A—B will be switched at the carrier frequency from a high impedance corresponding to the reverse impedance of the four diodes in series-parallel connection to a low impedance corresponding to the forward impedances of the diodes. The magnitude of the impedance swing is largely determined by the values of the series and parallel impedances associated with the diodes. RV1 in the main bridge is set to the geometric means of the impedances presented by the shunt modulator. The series resistors which are large compared with the forward resistance of the diodes are inserted to equalise the forward impedance of the diodes when biased in the forward direction, and RV2 provides a fine balance control. The shunt resistors which are small compared with the reverse impedances and large compared with the forward impedances of the diodes effectively swamp the diodes so that the difference in diode characteristics and especially the reverse impedance due to unequal reverse conduction of the diodes have little effect on the bridge balance. The potentiometer RV3 provides a fine balance control. The shunt resistors reduce the magnitude of the impedance swing but this has no effect on the linearity of the double balanced modulator. Satisfactory operation has been obtained with an impedance swing as little as 2:1. Suitable adjustments of RV2 and RV3 ensure accurate balancing of the shunt modulator with correspondingly small carrier leak; consequently the output signal contains only the sideband frequencies $f_c \pm f_m$, $3f_c \pm f_m$, $5f_c \pm f_m$, etc., the sidebands associated with the carrier harmonics may be readily removed by means of a suitable low-pass filter.

The four-arm bridge network comprising the shunt modulator is balanced for all cyclic conditions of the carrier frequency so that at the points *a*—*c* of the shunt modulator and also points A—B of the main bridge are always equi-potential. Thus no carrier current can flow in either the main bridge or the external circuit. The carrier currents are confined entirely to the shunt modulator circuit. The main bridge is balanced with respect to the mean impedance of the bridge arm containing the shunt modulator.

Figure 2:
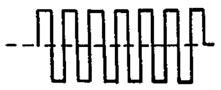
FIGURE 2 shows the output of the modulator when a steady direct current modulation signal is applied.

If now a fixed potential is applied to points A—C of the main bridge, the unbalance potential (due to the influence of the carrier on the impedance of arm A—B) that appears at points B—D will reverse periodically at the carrier frequency due to the symmetrical unbalancing of the bridge with respect to a mean point. FIGURE 2 shows the voltage waveform at B—D for this condition.

Figure 3:
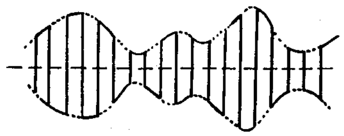
FIGURE 3 shows the output when a variable direct current modulation signal is applied.

When the modulating signal consists of a varying direct potential (as derived from a photo-cell in a facsimile transmission) the output waveform will appear as in FIGURE 3.

Figure 4:
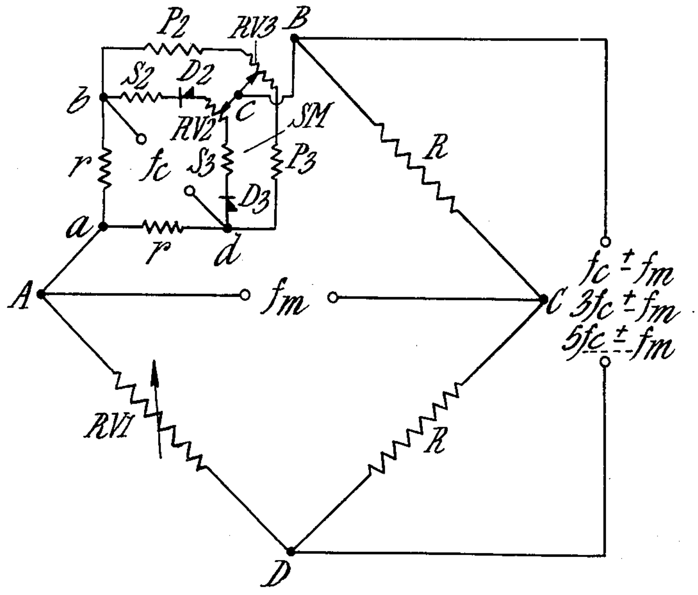
FIGURE 4 is a modified form of FIGURE 1.

FIGURE 4 is a reproduction of FIGURE 1 except in respect of arm A—B of the main bridge comprising modified shunt modulator SM wherein arm *b*—*c* comprises series resistor $S_2$, diode $D_2$ and parallel resistor $P_2$ and adjacent arm *c*—*d* comprises series resistor $S_3$, diode $D_3$ and parallel resistor $P_3$. The junction *c* of arms *b*—*c* and *c*—*d* is determined by the settings of balancing potentiometers RV2 and RV3, the movable contacts of which are joined and connected to point B of the main bridge. Arms *a*—*b* and *a*—*d* of the shunt modulator comprise resistors of equal value *r*, *r*, the resistance value of said resistors being preferably the geometric mean of the impedance change of either bridge arm *b*—*c* or *c*—*d*. Use of two diodes only in the shunt modulator results in a loss of efficiency in the complete amplitude modulator since the magnitude of the impedance change due to the carrier frequency is reduced. However, inequality in the characteristics of two diodes is correspondingly less than when four diodes are used and consequently less compensation by series and parallel resistors is required. This implies that the values of the series resistors may be reduced and the values of the parallel resistors may be increased and thus, the loss of efficiency is largely compensated.

Various modifications may be made within the scope of the invention.

We claim:

1. An amplitude modulator comprising a four-arm rectifier bridge network having input connections for a carrier frequency and output connections and being balanced for all cyclic conditions applied to the input circuit so that the output connections are at equi-potential and the impedance between them switched between a high and a low value for successive half cycles of the carrier frequency, a main bridge circuit having an input connection for a modulating frequency and an output connection, in one arm of which bridge circuit the output of the four-arm rectifier bridge is connected and in another arm of which a variable resistance is connected by which the bridge is balanced at the modulating frequency with respect to the mean impedance of the arm containing the four-arm rectifier bridge.

2. An amplitude modulator as claimed in claim 1, in which the four-arm rectifier bridge network has a rectifier in each arm, each rectifier having a series resistance in connection therewith and a parallel resistance connected across the rectifier and its series resistance.

3. An amplitude modulator as claimed in claim 1, in which the four-arm rectifier bridge circuit has rectifiers in two of the arms only, each rectifier having a series resistance in connection therewith and a parallel resistance connected across the rectifier and its series resistance.

References Cited in the file of this patent

UNITED STATES PATENTS 2,063,125 Rust ------------------- Dec. 8, 1936
2,715,718 Holtje ----------------- Aug. 16, 1955
2,947,935 Sepmeyer --------------- Aug. 2, 1960